United States Patent Office 3,442,642
Patented May 6, 1969

---

3,442,642
PREPARATION OF PLUTONIUM
William J. Ramsey, James O. Jepson, and David H. Wood, Livermore, Calif., assignors to the United States of America as represented by the United States Atomic Energy Commission
No Drawing. Filed May 10, 1968, Ser. No. 728,369
Int. Cl. C22b 61/04
U.S. Cl. 75—84.1            5 Claims

---

ABSTRACT OF THE DISCLOSURE

Plutonium is prepared by reacting dicesium plutonium hexachloride ($Cs_2PuCl_6$) with lithium.

---

The invention described herein was made in the course of, or under, Contract No. W-7405-ENG-48 with the United States Atomic Energy Commission.

Field of the invention

The invention provides a novel method for preparing metallic plutonium. It is especially useful as part of a process for recovering plutonium from waste solutions containing tetrapositive plutonium ions.

Prior art $Cs_2PuCl_6$, the starting material for the process of the present invention, is well known in the art, and may be prepared by any of several methods. In the J. Inorg. Nucl. Chem., 1960, vol. 13, pp. 310 to 312, it is suggested that this compound may serve as the starting point for the preparation of plutonium, but the only method suggested is electrolysis in molten CsCl, a method obviously quite distinct from that of the present invention.

Summary of the invention

According to the present invention, plutonium is prepared by reacting $Cs_2PuCl_6$ with Li. The equation for reaction is as follows.

$$Cs_2PuCl_6 + 4Li \rightarrow Pu + 4LiCl + 2CsCl$$

To obtain the purest plutonium it is desirable that the reaction be conducted above 640° C., the melting point of Pu, and that it be conducted in an inert atmosphere, for example, argon. It is preferable that it be conducted with an excess of lithium over the amount required by the above equation.

It is a particular unexpected advantage of the present invention that it is possible to conduct the reaction so that the plutonium solidifies while the slag is still molten, thereby providing a sharp separation of the phases. This behavior is in contrast to certain prior art reactions for preparing plutonium wherein the slag solidifies before the plutonium thereby entraining molten plutonium in the pores of the solid slag.

In a preferred embodiment of the invention, it is used as the last step of a process to recover plutonium from liquid solutions in which it was originally present in the tetravalent state. According to this process, tetrapositive plutonium ions in an acidic aqueous solution are contacted with an acidic solution of cesium chloride to precipitate $Cs_2PuCl_6$, which is then reacted with lithium as described above. This process is especially suitable for treating laboratory waste solutions, and recovering therefrom valuable plutonium.

Description of preferred embodiment

Further details of the invention process are described in the following example.

EXAMPLE

A saturated solution of CsCl in 1M HCl was added to a 1M solution of $Pu^{+4}$ ions in 5M HCl. The resulting precipitate of $Cs_2PuCl_6$ was washed three times with ethanol, followed by a single washing with acetone. The washed precipitate was placed in a vacuum chamber to remove any remaining solvent. 6.4 grams of $Cs_2PuCl_6$ was placed on top of 0.3 grams of lithium metal contained in an MgO crucible, which in turn was enclosed in a tantalum crucible. The charge was heated in an argon atmosphere by resistance heating at a rate of 10° C. per minute. An exothermic reaction occurred at 530° C., as evidenced by an anomalous temperature rise detected by a thermocouple inserted in the charge. Heating was continued to 730° C., the heater turned off, and the charge was allowed to cool at a rate of 0.77° C. per minute. The thermocouple detected the formation of solid slag at approximately 300° C. The crucible was broken open, and a button of plutonium, with some solid lithium adhering to its surface, was found encapsulated in the solid slag. The button was rinsed in methanol to remove the adhering lithium, and was treated with 2 N $HNO_3$ to provide a protective oxide coating on the fresh plutonium surface. The plutonium button weighed 1.7 grams, corresponding to 90% of the plutonium originally present as $Cs_2PuCl_6$.

The foregoing example was given solely for purposes of illustration, and should not be interpreted as a limitation of the invention, many variations of which will occur to those skilled in the art, without departing from the spirit or scope thereof.

What is claimed is.

1. A process for preparing plutonium comprising reacting dicesium plutonium hexachloride with lithium at a temperature above 640° C. in an inert atmosphere.

2. A process as claimed in claim 1 wherein the temperature is substantially 730° C.

3. A process as claimed in claim 1 wherein said inert atmosphere is argon.

4. A process as claimed in claim 1 wherein an excess of lithium is used.

5. A process for recovering plutonium from an aqueous solution in which it is present in the tetrapositive state, said process comprising acidifying said solution, reacting it with an acidic solution of cesium chloride, recovering the precipitated dicesium plutonium hexachloride and reacting it with an excess of lithium at a temperature above 640° C. and in an inert atmosphere.

References Cited

J. Inorg. Nucl. Chem., vol. 13, 1960, pp. 310–312.
Nuclear Science Abstracts, vol. 17, No. 11, June 15, 1963, p. 2371, Abstract No. 18166.

CARL D. QUARFORTH, *Primary Examiner.*

MELVIN J. SCOLNICK, *Assistant Examiner.*

U.S. Cl. X.R.

23—344